US012638973B2

(12) United States Patent
Neelannavar et al.

(10) Patent No.: US 12,638,973 B2
(45) Date of Patent: May 26, 2026

(54) MANAGING TIME-CRITICAL COMMANDS IN A MULTI-CORE STORAGE DEVICE

(71) Applicant: Sandisk Technologies, Inc., Milpitas, CA (US)

(72) Inventors: Savita Neelannavar, Bangalore (IN); Bhuvanesh Subramanian, Bangalore (IN); Akshay Ravindra, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/892,779

(22) Filed: Sep. 23, 2024

(65) Prior Publication Data

US 2026/0086717 A1     Mar. 26, 2026

(51) Int. Cl.
*G06F 3/06* (2006.01)

(52) U.S. Cl.
CPC .......... *G06F 3/0611* (2013.01); *G06F 3/0625* (2013.01); *G06F 3/0659* (2013.01); *G06F 3/0679* (2013.01)

(58) Field of Classification Search
CPC .... G06F 3/0611; G06F 3/0625; G06F 3/0659; G06F 3/0679; G06F 1/3287; G06F 1/3293
See application file for complete search history.

(56) References Cited

U.S. PATENT DOCUMENTS 8,766,707 B1 7/2014 Younger
10,915,160 B2 2/2021 Dalal

| | | | |
|---|---|---|---|
| 11,294,579 B2 | 4/2022 | Muthiah | |
| 11,385,811 B2 | 7/2022 | Jung | |
| 11,861,217 B2 | 1/2024 | Benisty | |
| 2015/0113305 A1* | 4/2015 | Shin ...................... | G06F 3/0679 |
| | | | 713/323 |
| 2015/0362980 A1* | 12/2015 | Tripathi ................ | G06F 1/3287 |
| | | | 713/324 |
| 2018/0210539 A1* | 7/2018 | Hashimoto ........... | G06F 1/3221 |
| 2022/0091932 A1* | 3/2022 | Kim ...................... | G06F 3/0679 |
| 2022/0100603 A1* | 3/2022 | Li .......................... | G06F 3/0656 |
| 2023/0066750 A1* | 3/2023 | Paaske .................. | G06F 1/3293 |
| 2023/0266889 A1* | 8/2023 | Li .......................... | G06F 3/0653 |
| | | | 711/103 |
| 2024/0295972 A1* | 9/2024 | Ruan ..................... | G06F 3/0659 |

* cited by examiner

*Primary Examiner* — Curtis James Kortman

(74) *Attorney, Agent, or Firm* — Arlene Neal; NEAL BLIBO LLC

(57)                    ABSTRACT

A storage device reduces power consumption and processes a first command in a low power mode. The storage device includes a controller to process host commands when the storage device is in a fully active state and to enter a deactivated state when the storage device enters the low power mode. An always-on processor on the storage device enters a sleep state when the storage device enters the low power mode. The always-on processor receives a notification of an incoming host command when the storage device is in the low power mode. When the always-on processor determines that the incoming command is a first command, the always-on processor processes the first command and remains in the sleep state. When the always-on processor determines the incoming command is a second command, the always-on processor may activate the controller to return the storage device to the fully active state.

18 Claims, 5 Drawing Sheets

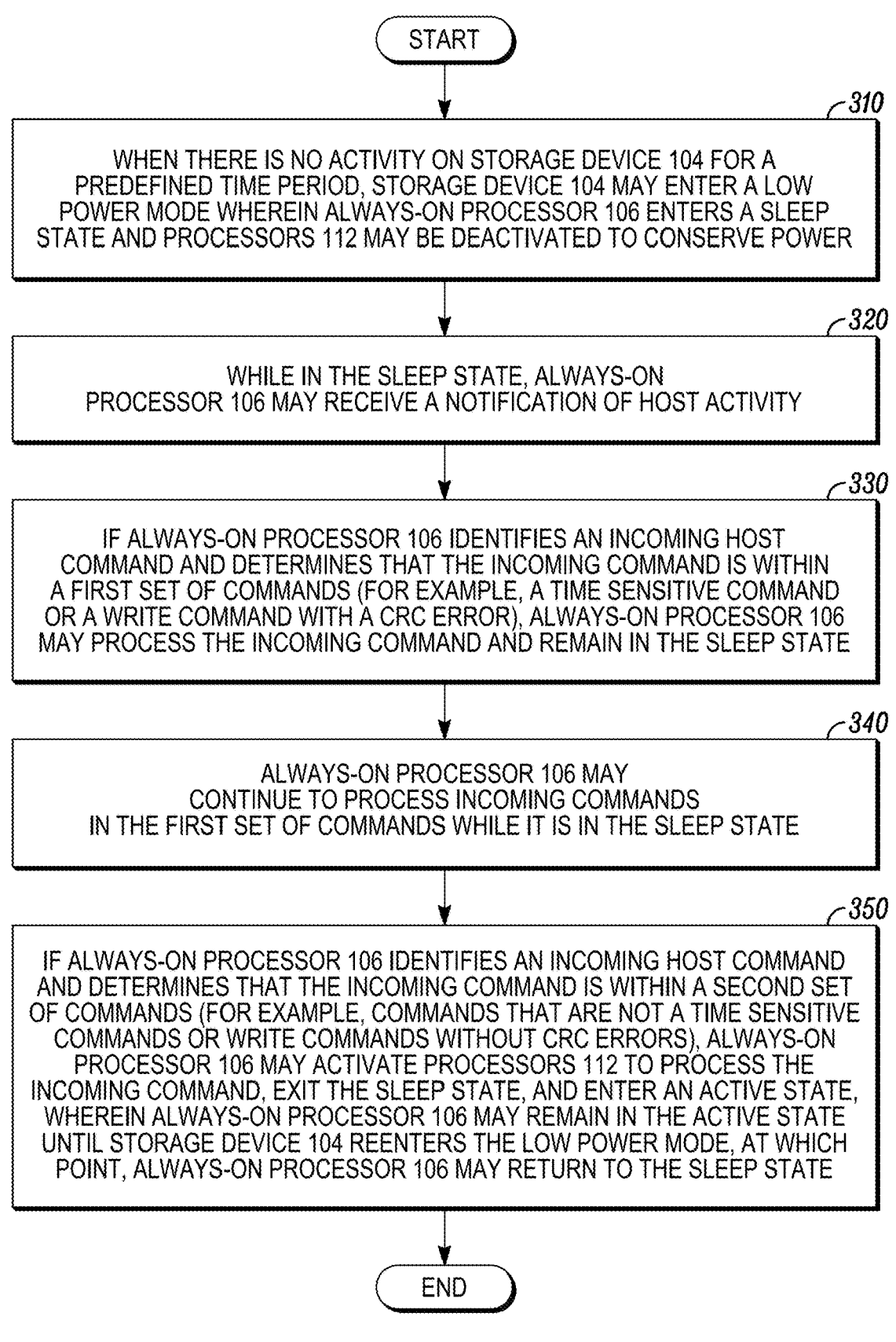

START

*310*

WHEN THERE IS NO ACTIVITY ON STORAGE DEVICE 104 FOR A PREDEFINED TIME PERIOD, STORAGE DEVICE 104 MAY ENTER A LOW POWER MODE WHEREIN ALWAYS-ON PROCESSOR 106 ENTERS A SLEEP STATE AND PROCESSORS 112 MAY BE DEACTIVATED TO CONSERVE POWER

*320*

WHILE IN THE SLEEP STATE, ALWAYS-ON PROCESSOR 106 MAY RECEIVE A NOTIFICATION OF HOST ACTIVITY

*330*

IF ALWAYS-ON PROCESSOR 106 IDENTIFIES AN INCOMING HOST COMMAND AND DETERMINES THAT THE INCOMING COMMAND IS WITHIN A FIRST SET OF COMMANDS (FOR EXAMPLE, A TIME SENSITIVE COMMAND OR A WRITE COMMAND WITH A CRC ERROR), ALWAYS-ON PROCESSOR 106 MAY PROCESS THE INCOMING COMMAND AND REMAIN IN THE SLEEP STATE

*340*

ALWAYS-ON PROCESSOR 106 MAY CONTINUE TO PROCESS INCOMING COMMANDS IN THE FIRST SET OF COMMANDS WHILE IT IS IN THE SLEEP STATE

*350*

IF ALWAYS-ON PROCESSOR 106 IDENTIFIES AN INCOMING HOST COMMAND AND DETERMINES THAT THE INCOMING COMMAND IS WITHIN A SECOND SET OF COMMANDS (FOR EXAMPLE, COMMANDS THAT ARE NOT A TIME SENSITIVE COMMANDS OR WRITE COMMANDS WITHOUT CRC ERRORS), ALWAYS-ON PROCESSOR 106 MAY ACTIVATE PROCESSORS 112 TO PROCESS THE INCOMING COMMAND, EXIT THE SLEEP STATE, AND ENTER AN ACTIVE STATE, WHEREIN ALWAYS-ON PROCESSOR 106 MAY REMAIN IN THE ACTIVE STATE UNTIL STORAGE DEVICE 104 REENTERS THE LOW POWER MODE, AT WHICH POINT, ALWAYS-ON PROCESSOR 106 MAY RETURN TO THE SLEEP STATE

END

*FIG. 3*

MANAGING TIME-CRITICAL COMMANDS IN A MULTI-CORE STORAGE DEVICE

BACKGROUND OF THE INVENTION

A storage device may be communicatively coupled to a host and to non-volatile memory including, for example, a NAND flash memory device on which the storage device may store data received from the host. The storage device may be a single-core storage device and operate according to a predefined specification or multi-core storage device and operate according to multiple predefined specifications. For example, a single-core storage device may operate according to a secure digital (SD) protocol and may use one processor to process host commands at relatively lower speeds of, for example, 1000 megabits per second (Mbits/sec) and 1 gigabits per second (Gbits/sec). In another example, a single-core storage device may operate according to a non-volatile memory express (NVMe) protocol to connect the host to the memory device at relatively higher speeds of greater than, for example, 5000 Mbits/sec. When the storage device is operating in an NVMe mode, the storage device may execute host commands with multiple processors for parallel processing and to achieve higher throughput. A multi-core storage device may operate using, for example, both the SD and the NVMe protocols.

Multi-core storage devices typically consume a high amount of power while they are active (i.e., while the storage device is processing host or background operations). To save power, if there is no activity for a predefined period of time, for example, five or ten milliseconds (ms), the storage device may enter a low power mode (LPM), wherein the processors on the storage device that may handle host commands and/or manage data storage on the memory device may become deactivated. While the processors on the storage device are deactivated when the storage device is in the LPM, an always-on processor on the storage device may receive an indication from hardware on the storage device when the storage device receives a host command. Upon receipt of the indication, the always-on processor may activate the other processors on the storage device to process the host command, thereby moving the storage device from the LPM to a fully active state where other processor(s) may handle the host command.

When the storage device is operating only in one mode, for example, the SD mode and is using one processor, the process for returning the storage device to the fully active status may be relatively quick. However, on a multi-core storage device, the wakeup process of having the always-on processor activate the other processors to return the storage device to the fully active status may take some time. For example, the wakeup process associated with returning a multi-core storage device to fully active status may take more than 10 ms.

While the storage device is in the LPM, the host may send time sensitive commands to the storage device and the storage device may have to completely process and respond to a time sensitive command within a predefined time period, or the command may time out. For example, the host may use the SD protocol to send time sensitive commands to the storage device, including a voltage switch command which may time out after 5 ms or a speed class command or a speed class control command which may time out in 10 ms. When the multi-core storage device in the LPM receives a time sensitive host command which may time out in, for example, 10 ms or less, as the storage device may have to activate multiple processors (for example, the processors used for both the NVMe and SD modes), the storage device may not have sufficient time to activate the other processors to complete and respond to the time sensitive command before the times out period expires.

In some situations, while the multi-core storage device is in the LPM the always-on processor may handle a time sensitive command or a Cyclic Redundancy Check (CRC) error in a write command and send a response to the host. The always-on process may also activate the other processors to remove the storage device from the LPM to the fully active state and thereafter subsequent host commands may be sent to the other processors. If, during the period where the other processors are been activated, the host sends a second time-sensitive command, the second time sensitive command may time out in a wakeup path if the other processors are not fully activated to process the second command before the time out period for the second time sensitive command expires.

SUMMARY OF THE INVENTION

In some implementations, a storage device may reduce power consumption and process a first command in a low power mode. The storage device includes a controller to process host commands when the storage device is in a fully active state and to enter a deactivated state when the storage device enters the low power mode. An always-on processor on the storage device may enter a sleep state when the storage device enters the low power mode. The always-on processor may receive a notification of an incoming host command when the storage device is in the low power mode. When the always-on processor determines that the incoming command is a first command, the always-on processor may process the first command in the low power mode and remain in the sleep state. When the always-on processor determines the incoming command is a second command, the always-on processor may activate the controller to return the storage device to the fully active state.

In some implementations, a method is provided on a storage device for preventing the storage device in a low power mode from timing out on a time sensitive command. The method includes processing, by a controller, host commands when the storage device is in a fully active state and entering a deactivated state when the storage device enters a low power mode. The method also includes entering, by an always-on processor, a sleep state when the storage device enters the low power mode and receiving a notification of an incoming host command when the storage device is in the low power mode. The method further includes determining, by the always-on processor, when the incoming command is a time sensitive command, processing the time sensitive command in the low power mode, and remaining in the sleep state after processing the time sensitive command. The method also includes determining, by the always-on processor, when the incoming command is a second command and activating the controller to return the storage device to the fully active state.

In some implementations, a method is provided for maintaining a storage device in a low power mode after the storage device receives a write command from a host. The method includes processing, by a controller, host commands when the storage device is in a fully active state and entering a deactivated state when the storage device enters a low power mode. The method also includes entering, by an always-on processor, a sleep state when the storage device enters the low power mode, receiving a notification of an incoming host command when the storage device is in the low power mode, determining when the incoming command is a write command with a cycle redundancy check error, processing the write command in the low power mode, and remaining in the sleep state after processing the write command. The method further includes determining, by the always-on processor, when the incoming command is a second command and activating the controller to return the storage device to the fully active state.

BRIEF DESCRIPTION OF THE DRAWINGS

FIG. 3 is an example flow diagram for enabling a multi-core storage device to process a first set of commands in a low power mode in accordance with some implementations.

Figure 1:
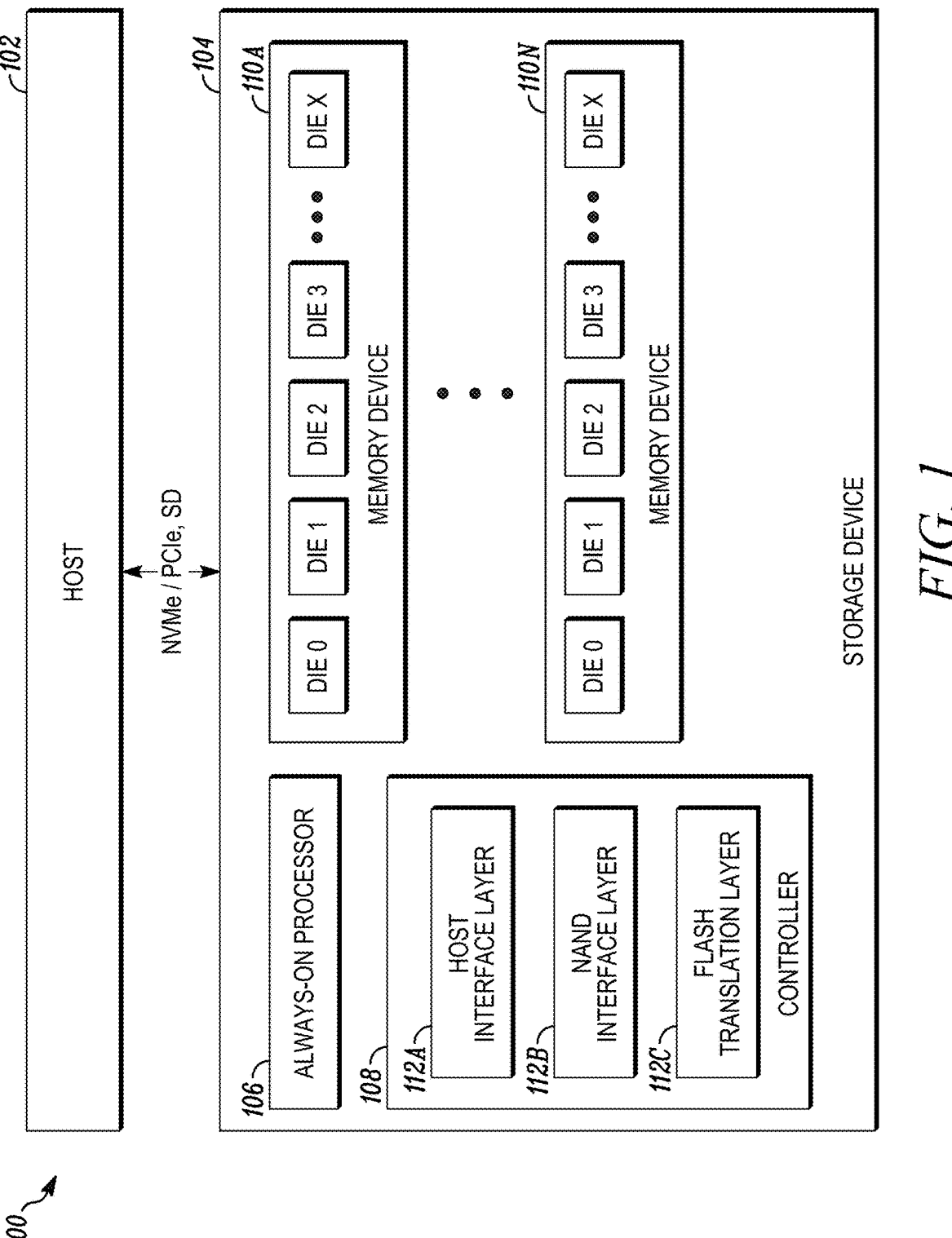
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104 that may be in the same physical location as components on a single computing device or on different computing devices that are communicatively coupled. Storage device 104, in various implementations, may be disposed in one or more different locations relative to the host 102 and storage device 104 may be a multi-core storage device. For example, storage device 104 may communicate with host 102 via a Non-Volatile Memory Express (NVMe) protocol over a peripheral component interconnect express (PCIe) interface, a secure digital (SD) protocol, and the like. Host 102 may include additional components (not shown in this figure for the sake of simplicity).

Storage device 104 may include an always-on processor (AON) 106, a controller 108, and one or more non-volatile memory devices 110a-110n (referred to herein as the memory device(s) 110). Storage device 104 may be, for example, a solid-state drive (SSD). Controller 108 may interface with host 102 and process foreground operations including instructions transmitted from host 102 when storage device is in a fully active state. For example, controller 108 may read data from and/or write to memory device 110 based on instructions received from host 102. Controller 108 may also execute background operations to manage resources on memory device 110. For example, controller 108 may monitor memory device 110 and may execute garbage collection and other relocation functions per internal relocation algorithms to refresh, recycle, and/or relocate the data on memory device 110.

Controller 108 may include one or more processors 112a-112c (referred to herein as processor(s) 112. Processors 112 may include a host interface layer 112a, a NAND interface layer 112b, a flash translation layer 112c. Host interface layer 112a may handle read, write, format and other commands in storage device 104. NAND interface layer 112b and flash translation layer 112c may manage storage on memory device 110.

Memory device 110 may be flash based. For example, memory device 110 may be a NAND or NOR flash memory that may be used for storing host and control data over the operational life of memory device 110. Memory device 110 may include multiple dies (for example, DIE 0-DIE X) for storing the data. The dies may be divided into physical blocks that may be grouped together into a plane. A memory die may include a single plane full of data blocks or multiple planes that have been linked together. Memory device 110 may be included in storage device 104 or may be otherwise communicatively coupled to storage device 104.

To conserve power on storage device 104, if controller 108/processors 112 (generally referred to herein as controller 108 or processors 112) are inactive for a predefined period, for example, five or ten milliseconds (ms), storage device 104 may leave a fully active state and enter the low power mode. While storage device 104 is in the low power mode, processors 112 may be deactivated and always-on processor 106 may enter a sleep state. Storage device 104 may provide a wakeup time value (i.e., the time needed to reactivate processors 112 and return storage device 104 to the fully active state) to always-on processor 106. The wake-up time value may be, for example, a predefined value or may be equivalent to one or more of the previous activation times for processors 112.

When storage device 104 enters the low power mode and always-on processor 106 is in the sleep state, always-on processor 106 may receive a notification from hardware on storage device 104 when host activity is detected on storage device 104. When host 102 sends a command to storage device 104 and always-on processor receives a notification of the host activity, always-on processor 106 may determine if the incoming command is in a first command category. A command in the first command category may be generally referred to herein as a first command and may be, for example, a time sensitive command that may time out in the wake-up path (i.e., a command that may time out during the time it takes to reactivate processors 112 when storage device 104 is in the low power mode). In another example, the first command may be a write command with a Cyclic Redundancy Check (CRC) error.

Always-on processor 106 may determine that the incoming host command is a time sensitive command if the timeout value associated with the command is greater than the wake-up time value associated with reactivating processors 112 to remove storage device 104 from the low power mode to the fully active state. If the incoming command is not a time sensitive command, always-on processor 106 may determine if the command is a write command, and if it is, during direct memory access of the first sector, always-on processor 106 may determine if the data includes a CRC error. If the incoming command is not a first command, for example, the data in the write command does not include a CRC error or the command is not a time sensitive command, always-on processor 106 may reactivate/wake up processors 112 for those processors to handle the host command and return storage device 104 to the fully active state. Always-on processor 106 may then enter an active state. When always-on processor 106 is in the active state, processors 112 may process host commands received by storage device 104. Always-on processor 106 may remain in the active state until storage device 104 reenters the low power mode at which point, always-on processor 106 may return to the sleep state When storage device 104 is in the low power mode and always-on processor 106 is in the sleep state, when always-on processor 106 determines that an incoming command is a time sensitive command (i.e., a first command), always-on processor 106 may process the time sensitive command, send a response to the time sensitive command to host 102, and remain in the sleep state. While in the sleep state, always-on processor 106 may continue to process incoming time sensitive (first) commands and send the response for a time sensitive command to host 102. This may ensure that storage device 104 does not timeout on time sensitive commands that would otherwise be placed in the wakeup path associated with reactivating processors 112.

When storage device 104 in the low power mode receives a write command, always-on processor 106 may determine if there is a CRC error in the first sector data, and if there is a CRC error in the first sector data, always-on processor 106 may determine that the write command is a first command, handle the write command, and remain in sleep state. As such, instead of waking up processors 112 to process write commands with CRC errors which may lead to increased power consumption for commands that cannot be fully processed because of the CRC, when always-on processor 106 processes write commands with CRC errors, this may preempt unnecessary reactivation of processors 112 and maintain reduced power consumption on storage device 104.

Always-on processor 106 in the sleep mode may activate processors 112 and cause storage device 104 to return to normal power consumption when storage device 104 receives an incoming command in a second command category (for example, a non-time sensitive command or a write command without a CRC error). A command in the second command category may be generally referred to herein as a second command. Otherwise, while storage device 104 is in the low power mode, if it receives one or more first commands (for example, a command whose timeout value is less than the wake-up time value or a write command with a CRC error), always-on processor 106 may remain in the sleep state and process those commands, thus allowing storage device 104 to not time out on time sensitive commands that would otherwise be placed in the wakeup path. Furthermore, by only waking up processors 112 when the incoming command is a second command, always-on processor 106 may not unnecessarily wake up processors 112, conserving power on storage device 104.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause processor 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
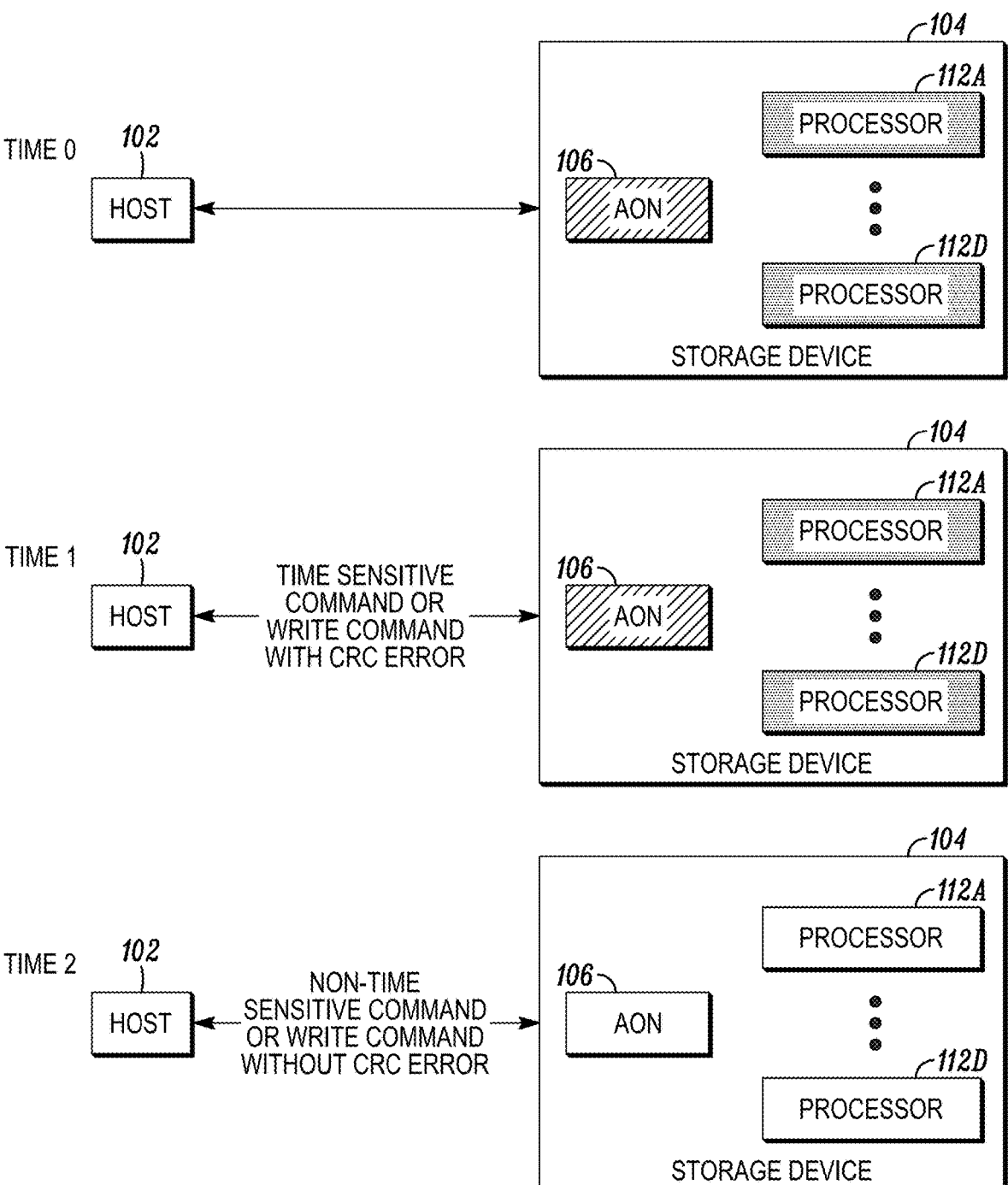
FIG. 2 is an example block diagram showing host commands sent from a host to a storage device in a low power mode in accordance with some implementations.

FIG. 2 is an example block diagram showing host commands sent from a host to a storage device in a low power mode in accordance with some implementations. At time 0, storage device 104 may enter a low power mode wherein processors 112 may be deactivated (as shown by the shading of processors 112) and always-on processor 106 may enter a sleep state (as shown be the diagonal shading of always-on processor 106). When processors 112 are deactivated, the power consumption of storage device 104 may reduce. At time 1, host 102 may send one or more commands to storage device 104. Always-on processor 106 may determine if each incoming command is a first command (for example, a time sensitive command or a write command with a CRC error). Assuming at time 1, that the incoming commands are time sensitive commands and/or write commands with a CRC error, always-on processor 106 may process the commands and remain in the sleep state.

Always-on processor 106 may remain in the sleep state until it identifies an incoming command that is a second command (for example, a command that is not a time sensitive command or write command with a CRC error), as shown at time 2. At time 2, when always-on processor 106 determines that the incoming command is a second command, always-on processor 106 may activate processors 112 and move to an active state (as shown by the lack of shading of always-on processor 112). While always-on processor 106 is in the active state, processors 112 may process incoming host commands. Always-on processor 106 may remain in the active state until storage device 104 reenters the low power mode. When storage device 104 reenters the low power mode, always-on processor 106 may return to the sleep state. As indicated above FIG. 2 is provided as an example. Other examples may differ from what is described in FIG. 2.

FIG. 3 is an example flow diagram for enabling a multi-core storage device to process a first set of commands in a low power mode in accordance with some implementations. At 310, when there is no activity on storage device 104 for a predefined time period, storage device 104 may enter a low power mode wherein always-on processor 106 enters a sleep state and processors 112 may be deactivated to conserve power. At 320, while in the sleep state, always-on processor 106 may receive a notification of host activity. At 330, if always-on processor 106 identifies an incoming host command and determines that the incoming command is within a first set of commands (for example, a time sensitive command or a write command with a CRC error), always-on processor 106 may process the incoming command and remain in the sleep state. At 340, always-on processor 106 may continue to process incoming commands in the first set of commands while it is in the sleep state. At 350, if always-on processor 106 identifies an incoming host command and determines that the incoming command is within a second set of commands (for example, commands that are not a time sensitive commands or write commands without CRC errors), always-on processor 106 may activate processors 112 to process the incoming command, exit the sleep state, and enter an active state wherein always-on processor 106 may remain in the active state until storage device 104 reenters the low power mode, at which point, always-on processor 106 may return to the sleep state. As indicated above FIG. 3 is provided as an example. Other examples may differ from what is described in FIG. 3.

Figure 4:
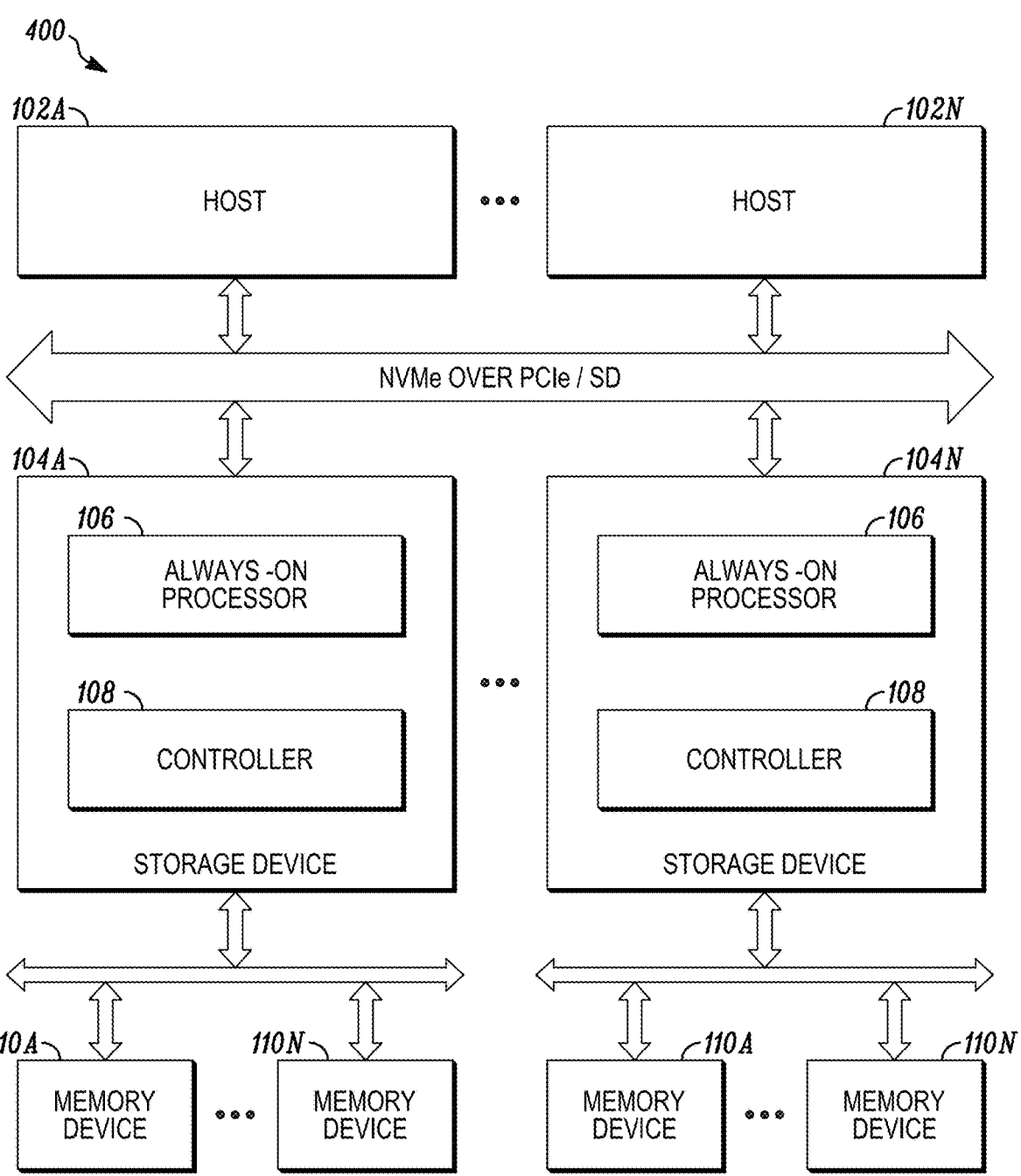
FIG. 4 is a diagram of an example environment in which systems and/or methods described herein are implemented.

FIG. 4 is a diagram of an example environment in which systems and/or methods described herein are implemented. As shown in FIG. 4, Environment 400 may include hosts 102-102n (referred to herein as host(s) 102), and one or more storage devices 104a-104n (referred to herein as storage device(s) 104). Storage device 104 may include always-on processor 106 to process time sensitive commands or write commands with CRC errors when storage device 104 is in a low power mode. Always-on processor 106 may ensure that storage device 104 does not time out when it receives time sensitive commands while storage device is in the low power mode and other processors on storage device are being activated. Hosts 102 and storage devices 104 may communicate via Non-Volatile Memory Express (NVMe) over peripheral component interconnect express (PCI Express or PCIe), SD, or the like.

Devices of Environment 400 may interconnect via wired connections, wireless connections, or a combination of wired and wireless connections. For example, the network in FIG. 4 may include NVMe over Fabric (NVMe-oF) Internet Small Computer Systems Interface (iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of Environment 400 may perform one or more functions described as being performed by another set of devices of Environment 400.

Figure 5:
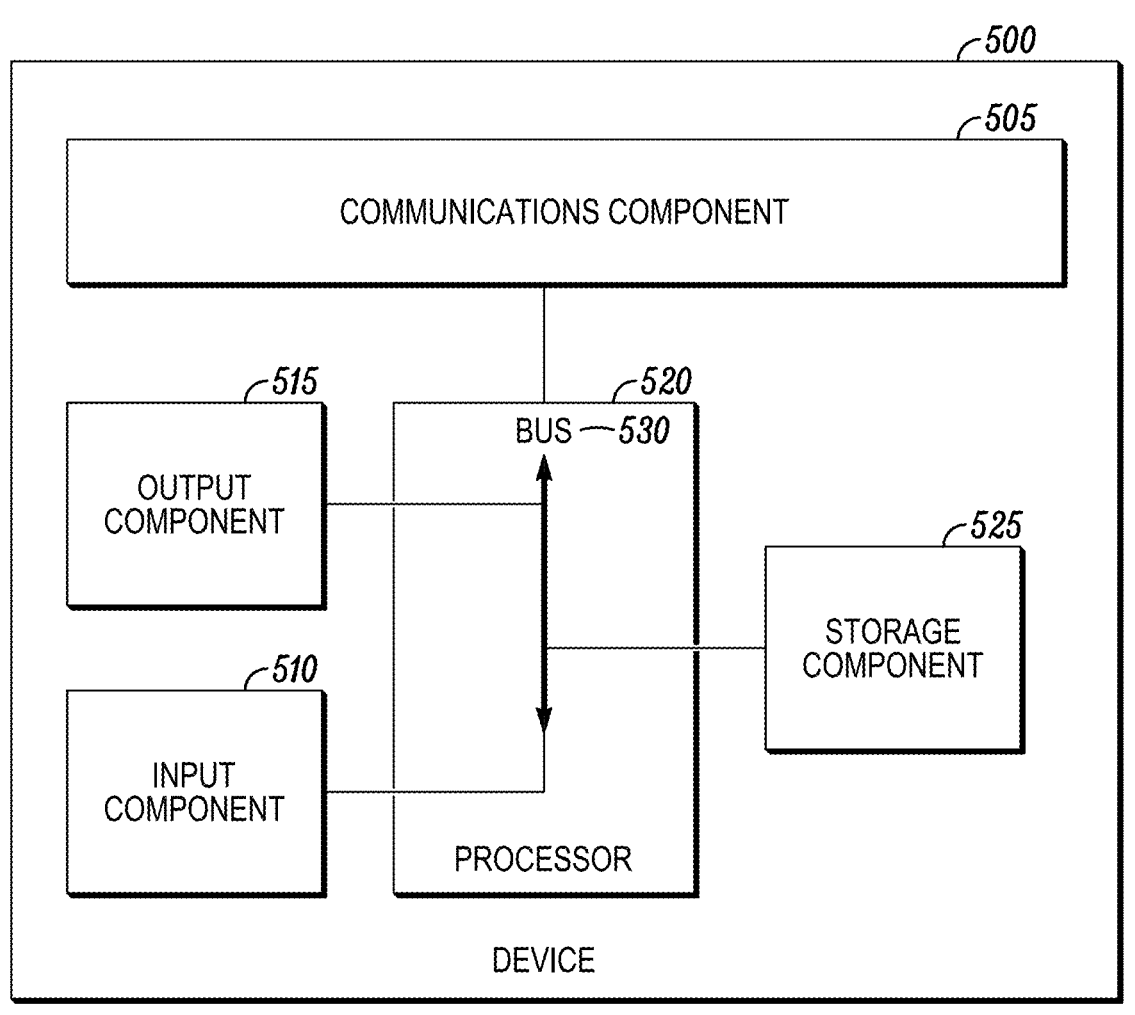
FIG. 5 is a diagram of example components of one or more devices of FIG. 1.

FIG. 5 is a diagram of example components of one or more devices of FIG. 1. In some implementations, host 102 may include one or more devices 500 and/or one or more components of device 500. Device 500 may include, for example, a communications component 505, an input component 510, an output component 515, a processor 520, a storage component 525, and a bus 530. Bus 530 may include components that enable communication among multiple components of device 500, wherein components of device 500 may be coupled to be in communication with other components of device 500 via bus 530.

Input component 510 may include components that permit device 500 to receive information via user input (e.g., keypad, a keyboard, a mouse, a pointing device, and a network/data connection port, or the like), and/or components that permit device 500 to determine the location or other sensor information (e.g., an accelerometer, a gyroscope, an actuator, another type of positional or environmental sensor). Output component 515 may include components that provide output information from device 500 (e.g., a speaker, display screen, and network/data connection port, or the like). Input component 510 and output component 515 may also be coupled to be in communication with processor 520.

Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 may include one or more processors capable of being programmed to perform a function. Processor 520 may be implemented in hardware, firmware, and/or a combination of hardware and software.

Storage component 525 may include one or more memory devices, such as random-access memory (RAM), read-only memory (ROM), and/or another type of dynamic or static storage device (e.g., a flash memory, a magnetic memory, and/or optical memory) that stores information and/or instructions for use by processor 520. A memory device may include memory space within a single physical storage device or memory space spread across multiple physical storage devices. Storage component 525 may also store information and/or software related to the operation and use of device 500. For example, storage component 525 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 505 may include a transceiver-like component that enables device 500 to communicate with other devices, such as via a wired connection, a wireless connection, or a combination of wired and wireless connections. The communications component 505 may permit device 500 to receive information from another device and/or provide information to another device. For example, communications component 505 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 505 may also include one or more broadband and/or narrowband transceivers and/or other similar types of wireless transceiver configurable to communicate via a wireless network for infrastructure communications. Communications component 505 may also include one or more local area network or personal area network transceivers, such as a Wi-Fi transceiver or a Bluetooth transceiver.

Device 500 may perform one or more processes described herein. For example, device 500 may perform these processes based on processor 520 executing software instructions stored by a non-transitory computer-readable medium, such as storage component 525. As used herein, the term "computer-readable medium" refers to a non-transitory memory device. Software instructions may be read into storage component 525 from another computer-readable medium or from another device via communications component 505. When executed, software instructions stored in storage component 525 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device for reducing power consumption and processing a first command in a low power mode, the storage device comprising:

a controller configured to process host commands when the storage device is in a fully active state and configured to enter a deactivated state when the storage device enters the low power mode; and an always-on processor configured to;

enter a sleep state when the storage device enters the low power mode;

receive a notification of an incoming host command when the storage device is in the low power mode;

in response to determining the incoming command is a first command and one of a time sensitive command and a write command with a cyclic redundancy check error, process the first command in the low power mode and remain in the sleep state; and in response to determining the incoming command is a second command, activate the controller to return the storage device to the fully active state.

2. The storage device of claim 1, wherein the always-on processor determines that the incoming command is time sensitive when a timeout value associated with the incoming command is greater than a wakeup time value.

3. The storage device of claim 2, wherein the wakeup time value is one of a predefined value and a value that is equivalent to one or more previous activation times for the controller.

4. The storage device of claim 1, wherein the always-on processor is configured to move to an active state when it activates the controller.

5. The storage device of claim 4, wherein the always-on processor is configured to remain in the active state until the storage device reenters the low power mode, and is further configured to return to the sleep state when the storage device enters the low power mode.

6. The storage device of claim 1, wherein processing the first command includes sending a response to the first command to the host.

7. The storage device of claim 1, wherein the second command is one of a command with a timeout value that is greater than a wakeup time value and a host write command without a cyclic redundancy check error.

8. A method for preventing a storage device in a low power mode from timing out on a time sensitive command, the method comprising:

processing, by a controller, host commands when the storage device is in a fully active state;

entering, by the controller a deactivated state when the storage device enters a low power mode;

entering, by an always-on processor, a sleep state when the storage device enters the low power mode;

receiving notifications, by the always-on processor, of incoming host commands when the storage device is in the low power mode;

determining, by the always-on processor, that an incoming command of the incoming host commands is a time sensitive command, and in response, processing the time sensitive command in the low power mode, remaining, by the always-on processor, in the sleep state after processing the time sensitive command; and determining, by the always-on processor, that an incoming command of the incoming host commands is a second command and, and in response, activating the controller to return the storage device to the fully active state.

9. The method of claim 8, wherein determining that the incoming command is the time sensitive command comprises determining that a timeout value associated with the respective incoming command is greater than a wakeup time value.

10. The method of claim 9, wherein the wakeup time value is one of a predefined value and a value that is equivalent to one or more previous activation times for the controller.

11. The method of claim 8, further comprising moving, by the always-on processor, to an active state when the always-on processor activates the controller.

12. The method of claim 11, further comprising remaining, by the always-on processor, in the active state until the storage device reenters the low power mode and returning, by the always-on processor, to the sleep state.

13. The method of claim 8, wherein processing the time sensitive command comprises sending a response to the time sensitive command to a host.

14. The method of claim 8, wherein the second command is one of a command with a timeout value that is greater than a wakeup time value and a host write command without a cyclic redundancy check error.

15. A method for maintaining a storage device in a low power mode after the storage device receives a write command from a host, the method comprising:

processing, by a controller, host commands when the storage device is in a fully active state;

entering, by the controller, a deactivated state when the storage device enters a low power mode;

entering, by an always-on processor, a sleep state when the storage device enters the low power mode;

receiving notifications, by the always-on processor, of incoming host commands when the storage device is in the low power mode;

determining, by the always-on processor, that an incoming command of the incoming host commands is a write command with a cyclic redundancy check error, and in response, processing the write command in the low power mode, remaining, by the always-on processor, in the sleep state after processing the write command; and determining, by the always-on processor, that an incoming command of the incoming host commands is a second command, and in response, activating the controller to return the storage device to the fully active state.

16. The method of claim 15, wherein processing the write command comprises sending a response to the write command to the host.

17. The method of claim 15, wherein the second command is one of a command with a timeout value that is greater than a wakeup time value and a host write command without a cyclic redundancy check error.

18. The method of claim 15, wherein determining, by the always-on processor, that the write command includes the cyclic redundancy check error comprises determining if there is the cyclic redundancy check error in a first sector data in the write command.

* * * * *